July 21, 1959  A. R. PERRINS  2,896,156
TRANSFORMER TEST CIRCUIT
Filed May 4, 1956

INVENTOR.
Allen R. Perrins
BY
Johnson and Kline
ATTORNEYS

United States Patent Office 2,896,156
Patented July 21, 1959

2,896,156

TRANSFORMER TEST CIRCUIT

Allen R. Perrins, Bristol, Conn., assignor to The Superior Electric Co., Bristol, Conn., a corporation of Connecticut Application May 4, 1956, Serial No. 582,856

10 Claims. (Cl. 324—55)

The present invention relates to the art of testing transformers and more particularly to the testing of a transformer by using synthesized load conditions which obviate the necessity of a static load.

Though a transformer may be tested by using a static load, use if often made, particularly with large transformers, of a "loading back" testing circuit in which the voltages induced in the winding of one transformer are made to oppose the voltages induced in the windings of the other transformer. Such a circuit requires two transformers of substantially similar rating and in which their primary windings are connected in parallel and to a source of A.C. supply and in which their secondary windings are connected in series opposition. Since the transformers are substantially similar, the voltage induced in one winding is equal and opposite to the voltage induced in the similar winding of the other transformer and accordingly, no current will flow in either circuit. A voltage is introduced in either the secondary circuit or the primary circuit to create unbalance in the circuit which causes a current to circulate in the circuits and the value of the current may be varied by the magnitude of the introduced voltage. The voltage is generally introduced by use of an additional transformer having a winding in the secondary circuit. Each test transformer thus appears to be operating at a load condition and yet only a small amount of power is required from a supply. In such a test circuit, while full kva. load conditions or a portion thereof may be synthesized, there has heretofore been no way of controlling the phase angle between the voltage and current circulating in the primary and secondary circuits. Accordingly, the "loading back" test circuit is limited solely to a synthesized load having only a single phase angle. This is a definite disadvantage since the phase angle of the load on a transformer has a significant influence on the excitation of the iron core and consequent influence on the thermal conditions occurring during heat run tests. In addition, if this type of connection is used to measure the voltage regulation of the transformer, the results obtained are valid only for the particular power factor given by the cosine of the phase angle as determined by the total impedance in the secondary circuit.

It is, accordingly, an object of this invention to provide in the testing of a transformer, a synthesized load in which the phase angle thereof may be varied and in which the limits thereof may be from substantially 90° leading to 90° lagging.

It is another object of this invention to provide in a "loading back" circuit for the testing of transformers for providing a variable value of circulating current which may be adjusted to produce the desired synthesized load condition.

A further object of this invention is to provide in the testing of transformers in the manner set forth above, for the simulation of conditions, in which the synthesized load voltage and current are in phase and thus the transformers appear to be resistively loaded.

In accomplishing the above set forth objects two substantially identical transformers are connected in a test circuit so as to have a circuit path for the primary windings and another circuit path for the secondary windings of the transformers. A feature of the present invention is to introduce into one of the paths a voltage which has a preselected phase or electrical degree relationship with the voltages in the transformer windings so as to make the phase angle between the voltage and current circulating in the path be at a desired value. The voltage introduced is controlled by variable elements which permit not only the magnitude of the voltage to be altered but also the electrical degrees or phase relationship with the other voltages in the test circuit may be altered.

Other features and advantages will hereinafter appear.

Figure 1:
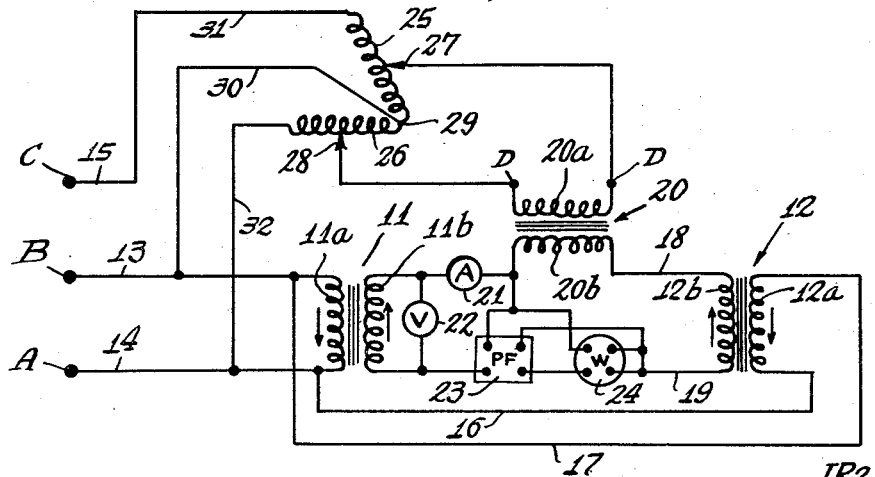
Figure 1 is a schematic diagram of the test circuit of the present invention.

Referring to Fig. 1, there is shown a schematic diagram of a "loading back" test circuit which is utilized to test transformers under synthesized load conditions. In the test circuit there is provided a first transformer 11, having a primary winding 11a and a secondary winding 11b, and also a second transformer 12 having a primary winding 12a and a secondary winding 12b. The winding 11a is connected across one phase of a three-phase power input, indicated by the reference characters A, B and C, by the leads 13 and 14. Lines 16 and 17 connect the winding 12a to the input leads 13 and 14 and in parallel with the winding 11a. The secondary windings 11b and 12b are placed in series by wires 18 and 19 so as to form a closed secondary circuit path.

In order to provide for the introduction of the control voltage, which determines the value of the circulating current, a control transformer 20 is provided having a primary winding 20a and a secondary winding 20b with the winding 20b connected to the wire 18 to be placed in series with the other secondary windings. An ammeter 21 and a voltmeter 22 together with a power factor meter 23 and a wattmeter 24 are preferably placed in this secondary circuit path to give visible indications of the power factor, voltage, amperage and wattage in the path.

In such a test circuit as has been illustrated, when a voltage is applied across the windings 11a by the leads 13 and 14, and the winding 12a by the leads 16 and 17, the secondary windings 11b and 12b will each have a voltage induced therein which if the transformers 11 and 12 are identical, are equal but opposite. Thus, no current flows in the leads 18 and 19. Upon the introduction of an unbalancing voltage by the transformer 20, current will flow in the secondary circuit path composed of elements 11b, 20b, 18, 12b and 19. Also this current will cause an unbalance of the voltages in the primary circuit (composed of elements 11a, 16, 12a and 17) so that a current will flow in the primary circuit. By varying the magnitude of the control voltage introduced into the path by the transformer winding 20b, the circulating currents flowing may be adjusted to the desired percentage of the full load ratings of the transformers. However, in both the primary and secondary circuits the relation between the amount of reactance and resistance determines the phase angle between the voltage and current circulating in the circuits and thus no control of this parameter is achieved.

To enable control of the phase angle, the present invention employs connections to make the control voltage introduced by the winding 20b variable in magnitude and also the electrical time degrees from the supply voltage and also from the voltage in the path. In carrying out the present invention while tap changing isolated transformers may be utilized, it is presently preferred to employ two variable autotransformers 25 and 26 having adjustable brushes 27 and 28 respectively. The autotransformers are connected together to form an open delta which yields a voltage adjustable in phase as well as in magnitude. Accordingly, each autotransformer has one end of its winding connected together at the point 29 which by a lead 30 is connected to the lead 14. A lead 31 connects the other end of the autotransformer 25 to the lead 15 while a lead 32 connects the end of the autotransformer 26 to the lead 13. The leads 13, 14 and 15 are connectible to the three-phase, three-wire supply, indicated by the reference characters A, B and C. The rating of each of the autotransformers 25 and 26 is preferably such as to be equal to or greater than the total kva. losses of the two transformers 11 and 12. The source of power for the control transformer 20 has been shown in the present embodiment as being selected phases of a three-phase source, one phase of which is used to supply the input power to the transformers under test. However, it is within the scope of the present invention to employ any other multi-phase, multi-wire voltage source having a constant magnitude and constant phase relationship with respect to the input voltage of the transformers 11 and 12.

In operating the present invention, the brushes 27 and 28 are adjusted on their respective autotransformers until the desired values of volts and amperes are present in the secondary circuit. The voltage of the autotransformer 26 is in phase with the voltage in the leads 13 and 14 while the voltage of the autotransformers 25 is spaced 60 electrical time degrees therefrom. Hence, the voltage across the windings 20a will be the vector sum of the voltage from the autotransformer 25 as determined by the position of the brush 27 and the voltage from the autotransformer 26 as determined by the position of the brush 28. Thus, if the brush 27 were positioned on the lead 31 and the brush 28 on the point 29, then the full line voltage between leads 31 and 30 will be impressed on the winding 20a, but will be spaced 60 electrical time degrees from the voltage across the winding 11a. Moreover, by maintaining the selective angularity between the brushes the magnitude of the voltage can be changed without varying the phase angle. Thus, the relative position of the brushes 28 and 27 determine the magnitude and time degrees association of the voltage introduced into the secondary path by the winding 20b.

Figure 2:
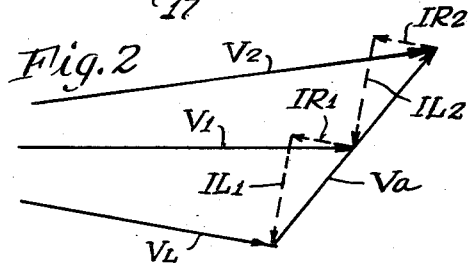
Fig. 2 is a vector diagram showing one relationship of the voltages and current in the secondary circuit path.

Shown in Fig. 2 is a vector diagram of the secondary circuit for the condition when it is desired to have the phase angle equal to zero and at which condition, the transformers appear to be resistively loaded. The vector $V_1$ represents the voltage applied to the winding 11b. The vector $V_L$ is the reading of the voltmeter 22 and the vector $V_a$ is the voltage, having a preselected phase angle with the vector $V_1$, which is introduced by the winding 20b. $IR_2$ represents the voltage drop due to resistance of the transformers 20 and 12 while $IR_1$ is the voltage drop caused by the resistance of the transformer 11. Vectors $IL_1$ and $IL_2$ are the reactance voltage drops due respectively to the transformer 11 and the transformers 20 and 12. The angle $\theta$ is the phase angle between the voltage (vector $V_1$) and the current (vector I) flowing in the secondary path as determined by the impedance of the transformers. From this diagram it can be seen that as the voltage $V_a$ introduced by the winding 20b is of a magnitude such as to equal the voltage drops caused by the impedance in the circuit and if this voltage is added with the proper time degrees from the voltages $V_1$, $V_2$ then the current I will be in phase with the voltage $V_L$ which thus synthesizes a resistive load on the transformer. Further, by adjusting the time degrees of $V_a$ with respect to the voltage $V_1$, any complex load from 90° leading to 90° lagging may be accomplished. This allows measurement of the temperature rise and regulation of the transformers over a steady condition of load while retaining the desirable feature of the "loading back" connection, namely, utilization of the small amount of power and obviating the requirement of a static load.

Figure 3:
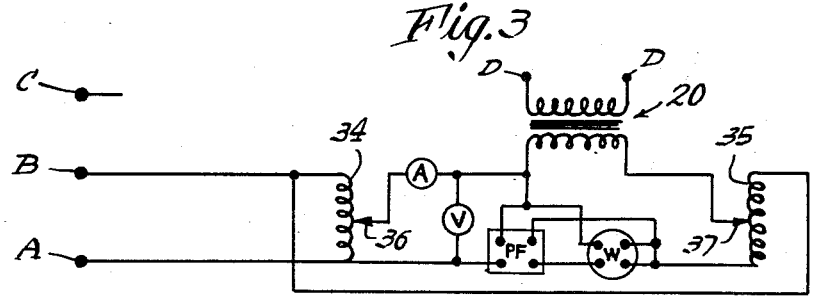
Fig. 3 is another embodiment of the present invention utilized to test autotransformers.

Shown in Fig. 3 is a schematic diagram of the test set-up when it is desired to test autotransformers. The circuit is substantially similar to that shown in Fig. 1. Accordingly, two autotransformers 34 and 35 are provided having brushes 36 and 37 respectively. The brushes 36 and 37 are interconnected in the manner shown for the secondary windings 11b and 12b with the control transformer 20 positioned in the circuit. The primary winding of the transformer 20 is connected to the points DD of Fig. 1 to complete the test circuit and provide for the introduction of the control voltage as explained above.

While the functioning of the test circuit has been set forth with the assumption that the two transformers 11 and 12 are identical, it will be apparent that if they are not, the magnitude and direction of the voltage introduced by the winding 20b can be altered to compensate for any differences which are present.

Though, in the specific embodiment of the invention described, the transformer 20 has been shown as introducing the control voltage into the circuit containing the secondary windings of the transformers, it is within the scope of the present invention to have the transformer 20 in the circuit containing the primary windings with the same recited results achieved. Additionally, multi-phase transformers may be tested according to the present invention by testing each phase in the manner shown for the single phase transformers 11 and 12.

While there has been shown two transformers 11 and 12, opposing each other, to form the test circuit with the control transformer 20 supplying the voltage unbalance, it is also within the concept of the present invention to eliminate the transformer 12 and have the output of the control transformer oppose the output of the test transformer 11. Thus, the control transformer can supply all of the voltage of proper phase and magnitude to synthesize any desired loading of the transformer under test.

The word "transformer" has been used throughout and is to be construed in the appended claims as being generic to and including an autotransformer. Additionally, though there is only one winding on an autotransformer, reference to a primary winding and a secondary winding are to be considered as referring to the parts of the winding which are equivalent to the primary and secondary windings of an isolated or two-winding transformer.

Variations and modifications may be made within the scope of the claims and portions of the improvements may be used without others.

I claim:

1. A test circuit for testing a transformer by synthesizing a load thereon comprising two transformers; a first circuit connecting the primary windings of the transformers in parallel and to a source of A.C.; a second circuit interconnecting the secondary windings of the transformers in series; adjustable means connected to a source of alternating current for supplying a voltage adjustable in phase and magnitude; and means for introducing said adjustable voltage into the circuits to cause unbalance thereof to cause current to flow in both circuits, said voltage having a phase difference with respect to the voltage across the primary windings in order to control the phase angle of the voltages and currents in the circuits.

2. A test circuit for testing a transformer by synthesizing a load thereon comprising two substantially similar transformers, each having primary and secondary windings; a first circuit connecting the primary winding of the transformers in parallel and to a source of A.C.; a second circuit interconnecting the secondary windings of the transformers in series; adjustable means connected to a source of alternating current for supplying a voltage adjustable in phase and magnitude; and means for introducing said adjustable voltage into the circuits to cause unbalance thereof to cause current to flow in both circuits, said voltage being determinately out of phase with the source of A.C. so that the voltages and currents in the circuits are caused to be in phase.

3. A test circuit for testing a transformer by synthesizing a load thereon comprising two substantially similar transformers; a first circuit connecting the primary windings of the transformers in parallel and to a source of A.C.; a second circuit interconnecting the secondary windings of the transformers in series; a third transformer having a secondary winding connected in the second circuit; adjustable means connected to a source of alternating current for supplying a voltage adjustable in phase and magnitude; and means connecting said adjustable means to the primary winding of the third transformer for introducing said adjustable voltage into the second circuit, whereby the phase angle of the synthesized load may be controlled.

4. A test circuit for synthesizing a load condition on a transformer comprising a first transformer having primary and secondary windings with the primary winding connectible to a source of A. C.; a second transformer having primary and secondary windings; means connecting the primary winding of the second transformer in parallel with the primary winding of the first transformer; and the secondary windings of the first and second transformers in series; adjustable means connected to a source of alternating current for supplying a voltage adjustable in phase and magnitude; and means for introducing said adjustable voltage into the circuits for causing current to circulate therein, the current constituting a synthesized load on the transformers.

5. A test circuit for synthesizing a load condition on a transformer comprising a first transformer having primary and secondary windings with the primary winding connectible to one phase of a three-phase, three-wire source of A.C.; a second transformer having primary and secondary windings and being substantially equal in rating to the first transformer; means connecting the primary winding of the second transformer in parallel with the primary winding of the first transformer; leads connecting the secondary windings of the first and second transformers in series; a third transformer having primary and secondary windings with its secondary winding connected to the secondary windings of the first and second transformers; two adjustable autotransformers, each having a winding and a movable brush; means for connecting the winding of one autotransformer across one phase of the A.C. source; means for connecting the other autotransformer across another phase of the A.C. source; a lead connecting the brush of one autotransformer to one end portion of the primary winding of the third transformer and a lead connecting the brush of the other autotransformer to the other end portion of the primary winding of the third transformer whereby the phase angle and magnitude of the synthesized load may be adjusted by movement of the brushes of the autotransformers.

6. The invention as defined in claim 5 in which the phase of the voltage across the primary winding of the first transformer is the same as the phase across one of the autotransformers.

7. A test circuit for testing a transformer having a pair of windings by synthesizing a load thereon comprising leads connecting one of the windings to a source of A.C.; a second transformer having a pair of windings; a circuit interconnecting the other winding of the first transformer and one of the windings of the second transformer in series opposition; a second circuit interconnecting the other winding of the second transformer to the first winding of the first transformer; adjustable means connected to a source of electrical energy for supplying a voltage having a variable phase angle and variable magnitude with respect to the input to the primary winding of the first transformer; and means connecting the adjustable means to one of the circuits for supplying said voltage to the said one of the circuits whereby a variable load on the first transformer may be synthesized.

8. A test circuit for testing a transformer by synthesizing a load thereon comprising two substantially similar transformers; a first circuit connecting the primary windings of the transformers in parallel and to a source of A.C.; a second circuit interconnecting the secondary windings of the transformers in series; a third transformer having a secondary winding connected in the second circuit; means connected to the primary winding of the third transformer for supplying a voltage that is adjustable in magnitude and phase, whereby the phase angle of the synthesized load may be controlled; and in which the last named means includes two adjustable autotransformers, and leads connectible to a polyphase source of A.C. and to the transformers for placing a voltage across each autotransformer, with the voltages being out of phase.

9. A test circuit for synthesizing a load condition on a transformer comprising a first transformer having primary and secondary windings with the primary winding connectible to a source of A.C.; a second transformer having primary and secondary windings; means connecting the primary winding of the second transformer in parallel with the primary winding of the first transformer; the secondary windings of the first and second transformers in series; means for introducing a voltage which is adjustable in phase angle and magnitude into the circuits for causing current to circulate therein, the current being a synthesized load on the transformers; in which the introducing means includes two adjustable autotransformers; and in which there are means for connecting the autotransformers across different phases of a polyphase source.

10. A test circuit for synthesizing a load condition on a transformer comprising a first transformer having primary and secondary windings with the primary winding connectible to a source of A.C.; a second transformer having primary and secondary windings; means connecting the primary winding of the second transformer in parallel with the primary winding of the first transformer; the secondary windings of the first and second transformers in series; means for introducing a voltage which is adjustable in phase angle and magnitude into the circuits for causing current to circulate therein, the current being a synthesized load on the transformers; in which the introducing means includes two adjustable autotransformers; in which there are means for connecting the autotransformers across different phases of a polyphase source; in which the introducing means includes a third transformer having primary and secondary windings with the primary winding connected to the output of the autotransformers; and in which the secondary winding is connected in series with the secondary windings of the first and second transformers.

References Cited in the file of this patent

UNITED STATES PATENTS 2,527,568     Murray _____ Oct. 31, 1950

FOREIGN PATENTS 439,661     Great Britain _____ Dec. 11, 1935

OTHER REFERENCES

General Radio Experimenter, vol. 30, No. 5, October 1955, page 7, Figure 1.